(12) United States Patent
Hayama

(10) Patent No.: US 8,982,427 B2
(45) Date of Patent: Mar. 17, 2015

(54) IMAGE PROCESSING APPARATUS, IMAGE PROCESSING METHOD, AND STORAGE MEDIUM

(71) Applicant: KYOCERA Document Solutions Inc., Osaka-shi, Osaka (JP)

(72) Inventor: Satoru Hayama, Osaka (JP)

(73) Assignee: KYOCERA Document Solutions Inc., Osaka-shi (JP)

( * ) Notice: Subject to any disclaimer, the term of this patent is extended or adjusted under 35 U.S.C. 154(b) by 0 days.

(21) Appl. No.: 14/077,105

(22) Filed: Nov. 11, 2013

(65) Prior Publication Data
US 2014/0139890 A1 May 22, 2014

(30) Foreign Application Priority Data

Nov. 20, 2012 (JP) ................................ 2012-254169

(51) Int. Cl.
*H04N 1/04* (2006.01)
*H04N 1/32* (2006.01)

(52) U.S. Cl.
CPC .... *H04N 1/32144* (2013.01); *H04N 2201/3273* (2013.01); *H04N 2201/3266* (2013.01); *H04N 2201/0094* (2013.01)
USPC ............ 358/474; 358/498; 358/497; 358/496

(58) Field of Classification Search
USPC .................. 382/181; 358/474, 498, 497, 496
See application file for complete search history.

(56) References Cited

U.S. PATENT DOCUMENTS 8,077,971 B2 * 12/2011 Enomoto et al. .............. 382/181

FOREIGN PATENT DOCUMENTS

JP 2009098777 A 7/2009

* cited by examiner

*Primary Examiner* — Houshang Safaipour
(74) *Attorney, Agent, or Firm* — Alleman Hall McCoy Russell & Tuttle LLP

(57) ABSTRACT

An image processing apparatus includes a data generation portion that generates text-searchable electronic data by superimposing transparent text data obtained by causing, to be transparent, text data contained in document sheet data stored in advance in a storage portion, and image data read from a document sheet by an image reading portion.

6 Claims, 7 Drawing Sheets

IMAGE PROCESSING APPARATUS, IMAGE PROCESSING METHOD, AND STORAGE MEDIUM

INCORPORATION BY REFERENCE

This application is based upon and claims the benefit of priority from the corresponding Japanese Patent Application No. 2012-254169 filed on Nov. 20, 2012, the entire contents of which are incorporated herein by reference.

BACKGROUND

The present disclosure relates to a technology of generating text-searchable electronic data by superimposing transparent text data on image data read from a document sheet.

Conventionally, character-recognition function of recognizing characters contained in image data of a document sheet read by a scanner is known. In addition, a technology of generating text-searchable electronic data by superimposing, on image data read from a document sheet, data of characters recognized from the image data by using a character-recognition function as transparent text data is also known.

SUMMARY

An image processing apparatus according to one aspect of the present disclosure includes a data generation portion that generates text-searchable electronic data by superimposing transparent text data obtained by causing, to be transparent, text data contained in document sheet data stored in advance in a storage portion, and image data read from a document sheet by an image reading portion.

An image processing method according to another aspect of the present disclosure includes the steps of preparing a storage portion having stored therein document sheet data containing text data; and generating text-searchable electronic data by superimposing transparent text data obtained by causing, to be transparent, the text data contained in the document sheet data stored in the storage portion, and image data read from a document sheet by an image reading portion.

A storage medium according to another aspect of the present disclosure is a computer-readable storage medium having stored therein an image processing program enabling execution of a data generation step of generating text-searchable electronic data by superimposing transparent text data obtained by causing, to be transparent, text data contained in document sheet data, and image data read from a document sheet by image reading means.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

In the following, embodiments of the present disclosure will be described with reference to the accompanying drawings in order to allow understanding of the present disclosure. It should be noted that the following embodiments are examples embodying the present disclosure, and, by nature, do not limit the technical scope of the present disclosure.

<Schematic Configuration of Multifunction Peripheral 10>

Figure 1A:
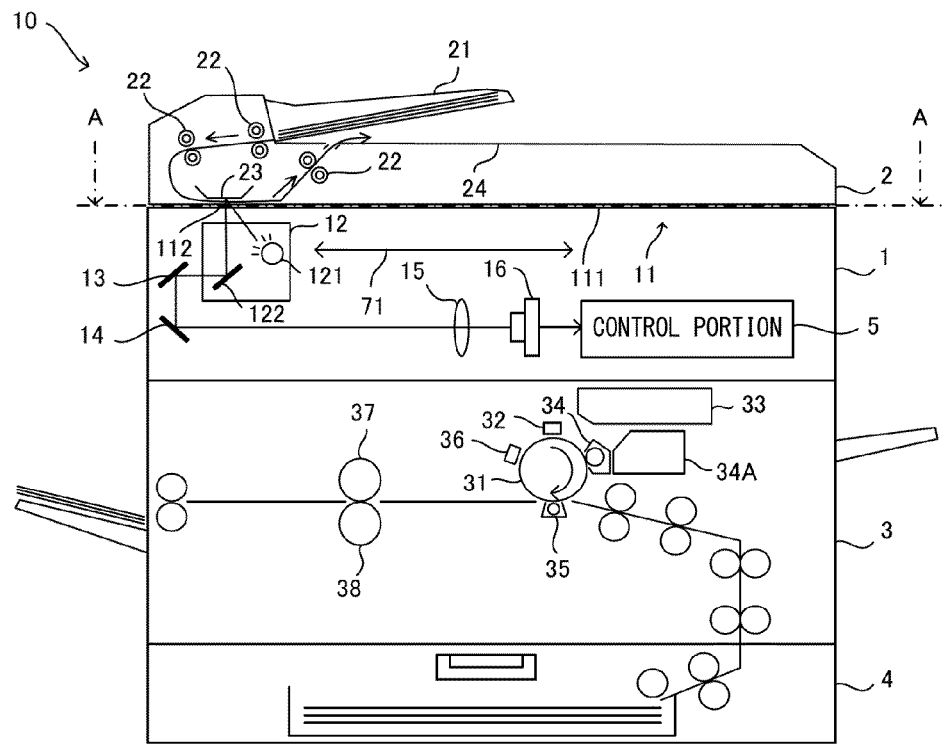
FIG. 1A and FIG. 1B are configuration diagrams of a multifunction peripheral according to one embodiment of the present disclosure.
Figure 1B:
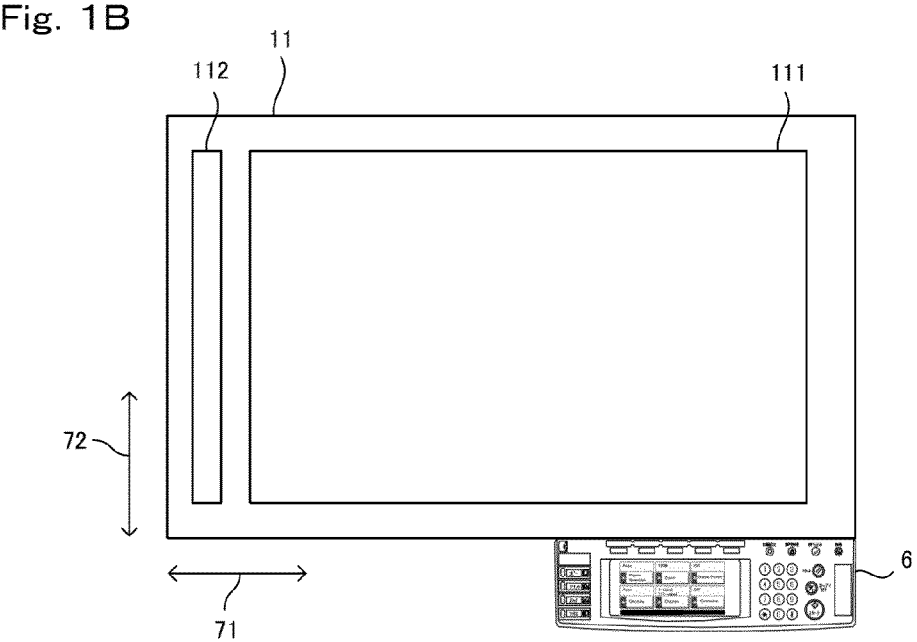

First, with reference to FIG. 1 and FIG. 2, the schematic configuration of a multifunction peripheral 10 according to an embodiment of the present disclosure will be described. Here, FIG. 1A is a schematic sectional view of the multifunction peripheral 10, and FIG. 1B is a view as seen from the direction of arrows A in FIG. 1A. It should be noted that the present disclosure is also applicable to image processing apparatuses such as facsimile machines, copy machines, and scanners each having an image reading function of reading image data from a document sheet.

Figure 2:
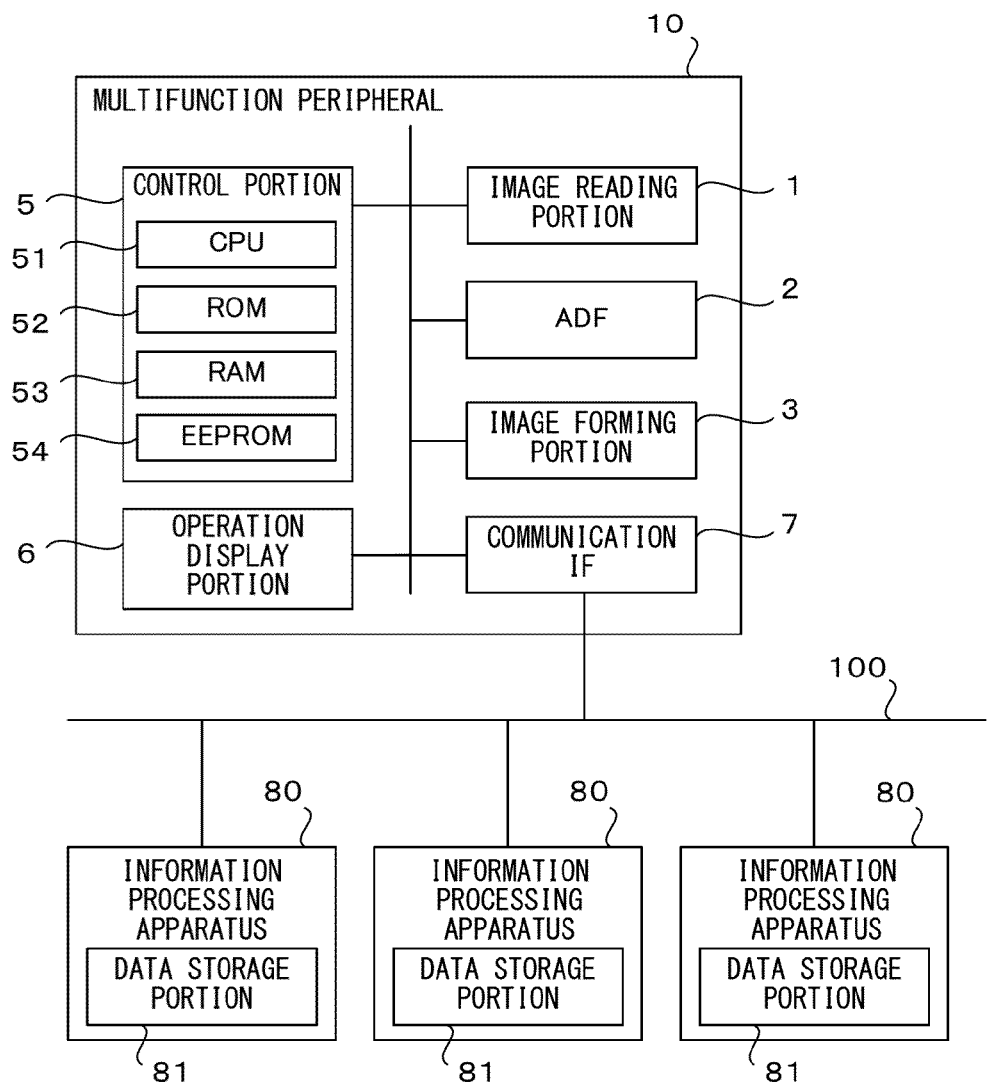
FIG. 2 is a block diagram showing a system configuration of the multifunction peripheral according to one embodiment of the present disclosure.

As shown in FIG. 1 and FIG. 2, the multifunction peripheral 10 is an image processing apparatus including an image reading portion 1, an ADF 2, an image forming portion 3, a sheet feed cassette 4, a control portion 5, an operation display portion 6, a communication IF 7, and the like. The operation display portion 6 is a touch panel or the like that displays various kinds of information in accordance with a control instruction from the control portion 5 and allows input of the various kinds of information to the control portion 5.

As shown in FIG. 1A, the image reading portion 1 includes a document sheet table 11, a reading unit 12, mirrors 13 and 14, an optical lens 15, a CCD (Charge Coupled Device) 16, and the like. The image reading portion 1 can read image data from a document sheet.

The document sheet table 11 is disposed on the upper surface of the image reading portion 1. The document sheet table 11 includes a document sheet mounting surface 111 and a conveying-and-reading surface 112. The document sheet mounting surface 111 is a translucent contact glass on which a document sheet from which image data is read is placed. The conveying-and-reading surface 112 is a glass for conveying and reading, through which light irradiated from the reading unit 12 to a document sheet conveyed by the ADF 2 passes.

The reading unit 12 includes an LED light source 121 and a mirror 122, and can move toward a secondary scanning direction 71 by a moving mechanism, which is not shown, using a stepping motor or the like. When the reading unit 12 moves in the secondary scanning direction 71 by the driving portion, light irradiated from the LED light source 121 onto the document sheet table 11 is scanned in the secondary scanning direction 71.

The LED light source 121 includes multiple white LEDs arranged along a primary scanning direction 72. The LED light source 121 irradiates white light on a document sheet for an amount corresponding to a single line in the primary scanning direction 72, through the conveying-and-reading surface 112 or the document sheet mounting surface 111 of the document sheet table 11. The mirror 122 reflects, toward the mirror 13, reflected light obtained when the light from the LED light source 121 is irradiated on the document sheet at the reading position. The light reflected by the mirror 122 is guided to the optical lens 15 by the mirror 13 and the mirror 14. The optical lens 15 concentrates the light entering thereto and causes the concentrated light to enter the CCD 16.

The CCD 16 is a photoelectric conversion element that converts received light into an electrical signal (voltage) corresponding to the amount of the light, and outputs the electrical signal as image data. The CCD 16 inputs, to the control portion 5 as the image data of the document sheet, the electrical signal based on the reflected light entering thereto obtained when the light irradiated from the LED light source 121 is reflected from the document sheet.

As shown in FIG. 1A, the ADF 2 is an automatic document sheet conveying apparatus including a document sheet set portion 21, multiple conveying rollers 22, a document sheet holding portion 23, a sheet discharge portion 24, and the like. The document sheet holding portion 23 is disposed above the conveying-and-reading surface 112, with an interval provided therebetween so as to allow the document sheet to pass through.

The ADF 2 drives each of the conveying rollers 22 by motors not shown to convey a document sheet on the document sheet set portion 21 so as to pass through the position where image data is read by the image reading portion 1 to the sheet discharge portion 24. With this, the image reading portion 1 can read the image data from the document sheet by irradiating light through the conveying-and-reading surface 112 from the reading unit 12 on the document sheet conveyed by the ADF 2.

The image forming portion 3 is an electronic photograph type image forming portion that executes an image formation process (printing process) based on image data read by the image reading portion 1 or image data inputted from an information processing apparatus such as an exterior personal computer.

Specifically, as shown in FIG. 1A, the image forming portion 3 includes a photoconductor drum 31, a charging device 32, an exposure device (LSU) 33, a developing device 34, a transfer roller 35, a charge neutralizing device 36, a fixing roller 37, a pressure roller 38, and the like. In the image forming portion 3, an image is formed by the following procedure on a paper sheet supplied from the sheet feed cassette 4.

First, the photoconductor drum 31 is uniformly charged at a predetermined potential by the charging device 32. Next, light based on the image data is irradiated on the surface of the photoconductor drum 31 by the exposure device 33. With this, an electrostatic latent image corresponding to the image data is formed on the surface of the photoconductor drum 31. Then, the electrostatic latent image on the photosensitive drum 31 is developed (visualized) as a toner image by the developing device 34. It should be noted that toner (developer) is supplied to the developing device 34 from a toner container 34A that is detachable with respect to the image forming portion 3. Subsequently, the toner image formed on the photoconductor drum 31 is transferred onto a paper sheet by the transfer roller 35. Then, the toner image transferred onto the paper sheet is melted and fixed after being heated by the fixing roller 37 when the paper sheet passes between the fixing roller 37 and the pressure roller 38. It should be noted that the potential of the photoconductor drum 31 is neutralized by the charge neutralizing device 36.

As shown in FIG. 2, the control portion 5 is a computer that controls the operation of the multifunction peripheral 10 and includes control instruments such as a CPU 51, a ROM 52, a RAM 53, and an EEPROM 54. More specifically, the control portion 5 causes the multifunction peripheral 10 to execute a scanning process, a printing process, a facsimile process, etc., by causing the CPU 51 to execute various kinds of control programs stored in advance in the ROM 52. In addition, the RAM 53 is a volatile storage portion and the EEPROM 54 is a nonvolatile storage portion, and they are used as temporary storage memory or image memory for the various kinds of processes executed by the CPU 51. It should be noted that the control portion 5 may be formed from an electronic circuit such as an integrated circuit (ASIC or DSP), or may be a control portion provided separately from a main control portion that performs overall control of the multifunction peripheral 10.

Furthermore, on the ROM 52 of the control portion 5, an image processing program that causes the CPU 51 of the control portion 5 to execute a later described PDF reading process (cf. flowchart in FIG. 3) is stored in advance. By executing the PDF reading process, the control portion 5 generates text-searchable PDF by superimposing transparent text data on the image data read by the image reading portion 1.

It should be noted that the image processing program is stored in a computer-readable storage medium such as a CD, a DVD, and a flash memory; and may be installed on a storage portion such as the EEPROM 54 of the control portion 5 from the storage medium. The present disclosure may be regarded as a disclosure of an image processing method of executing each processing procedure of the PDF reading process by the multifunction peripheral 10. Furthermore, the present disclosure may be regarded as a disclosure of a computer-readable storage medium having stored therein an image processing program causing the control portion 5 to execute each processing procedure of the PDF reading process.

As shown in FIG. 2, the communication IF 7 is a communication interface that connects the multifunction peripheral 10 with a communication network 100 such as LAN through wireless or wired communication, and executes data communication through the communication network 100. More specifically, the multifunction peripheral 10 is communicably connected to a single or multiple information processing apparatuses 80 through the communication network 100.

The information processing apparatus 80 is, for example, a personal computer, and includes a data storage portion 81 such as a hard disk or an SSD that stores various kinds of data. In the data storage portion 81, a shared data folder that can be referred to from the control portion 5 of the multifunction peripheral 10 is provided. In addition, document sheet data containing text data is stored in advance in the shared data folder of the data storage portion 81, and the information processing apparatus 80 prints the document sheet data on the multifunction peripheral 10 by transmitting the document sheet data to the multifunction peripheral 10.

<PDF Reading Process>

Figure 3:
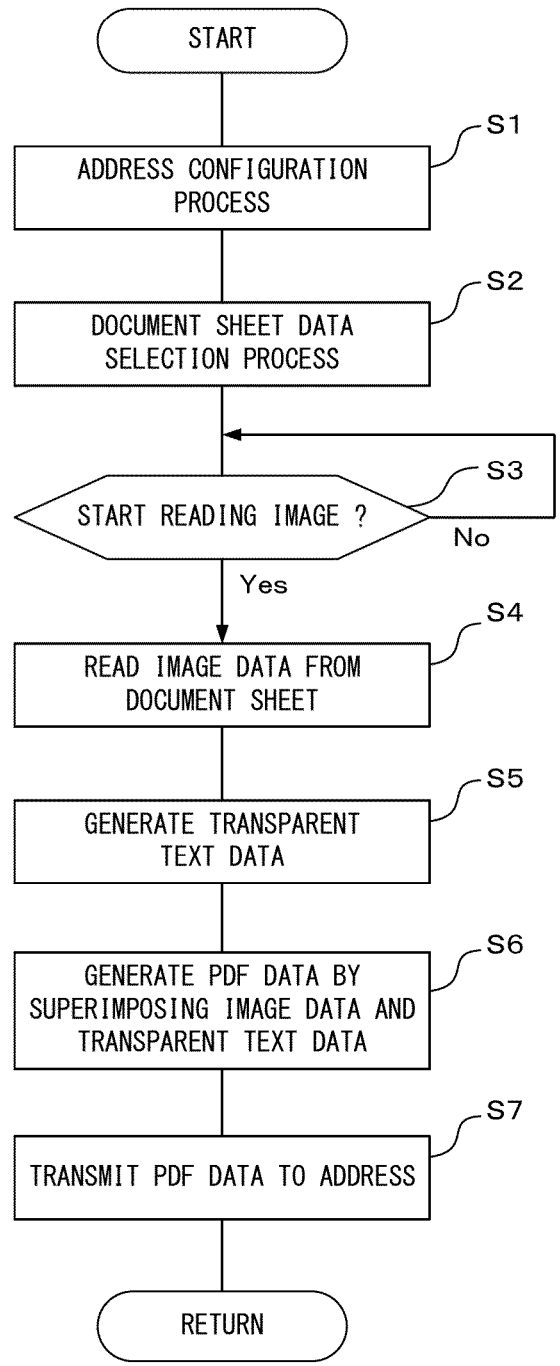
FIG. 3 is a flowchart for describing one example of procedures in a PDF reading process executed by the multifunction peripheral according to one embodiment of the present disclosure.

In the following, one example of the procedures of the PDF reading process executed by the control portion 5 will be described with reference to FIG. 3. Here, steps S1, S2, etc., represent identification numbers of processing procedures (steps) executed by the control portion 5. The PDF reading process is started by the control portion 5 when, for example, a network scanning function is selected on the operation display portion 6.

Figure 4A:
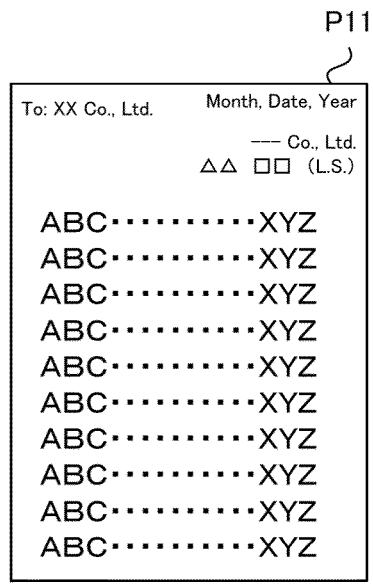
FIG. 4A, FIG. 4B and FIG. 4C show one example of document sheet data, image data, and PDF data according to one embodiment of the present disclosure.
Figure 4B:
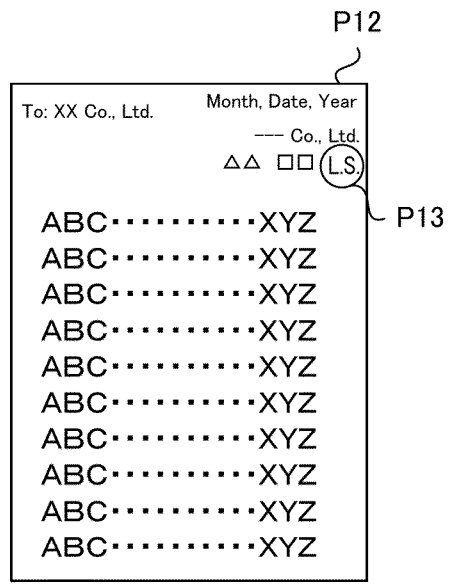

Here, for convenience of description, the PDF reading process will be described by using as an example a case in which image data P12 shown in FIG. 4B is read by the image reading portion 1 from a document sheet that is printed based on document sheet data P11 shown in FIG. 4A and that is sealed with a seal. It should be noted that the document sheet data P11 is electronic data such as, for example, a Word file of Microsoft Corp., and includes text data. Furthermore, the image data P12 is, for example, image data such as PDF, TIFF, GIF, or JPEG, and includes a seal image P13.

[Step S1]

First, at step S1, the control portion 5 configures an address (storage destination) of PDF data that is to be generated by the PDF reading process in accordance with a user operation performed on the operation display portion 6. More specifically, the control portion 5 displays, on the operation display portion 6, an address selection screen arranged with a list of pre-registered addresses or a list of addresses that are currently communicable.

Figure 5A:
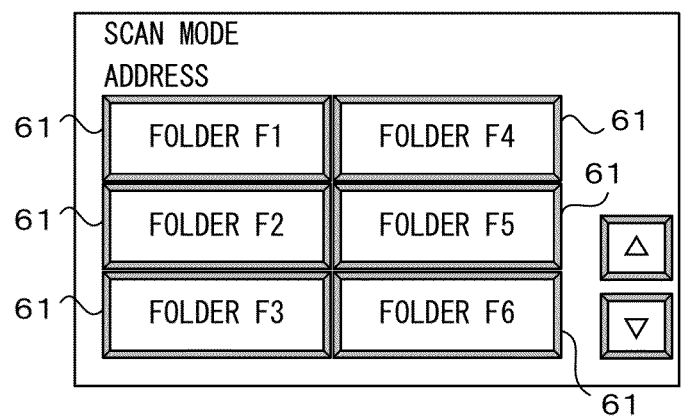
FIG. 5A and FIG. 5B show one example of screens display in the PDF reading process executed by the multifunction peripheral according to one embodiment of the present disclosure.

Here, FIG. 5A shows one example of the address selection screen displayed on the operation display portion 6. As shown in FIG. 5A, multiple address keys 61 indicating folders F1 to F6, which are names of folders having stored therein the PDF data, are displayed on the address selection screen. It should be noted that the display of the address keys 61 is identification information for identifying a storage destination of the PDF data, such as, for example, apparatus name of the information processing apparatus 80, IP address, user name, or user ID.

Then, the control portion 5 configures, as a storage destination of the image data from the PDF reading process, an address corresponding to an address key 61 selected by a user operation performed on the operation display portion 6 in the address selection screen. It should be noted that it is also conceivable to select, as a storage destination of the PDF data, a storage portion such as a hard disk in the multifunction peripheral 10, or a storage medium such as a USB memory that is detachable with respect to the multifunction peripheral 10.

[Step S2]

Next, at step S2, the control portion 5 selects document sheet data that is to be combined with the image data read by the image reading portion 1 in accordance with a user operation performed on the operation display portion 6. More specifically, the control portion 5 displays, on the operation display portion 6, a document sheet data selection screen arranged with a list of document sheet data stored in the data storage portion 81 of the information processing apparatus 80 selected as the address. It should be noted that the storage portion having stored therein in advance the document sheet data selected here may be a storage portion such as a hard disk which is not shown or the EEPROM 54 disposed in the multifunction peripheral 10. In addition, it is also possible to select the document sheet data stored in advance in a storage medium such as a USB memory which is detachable with respect to the multifunction peripheral 10.

Figure 5B:
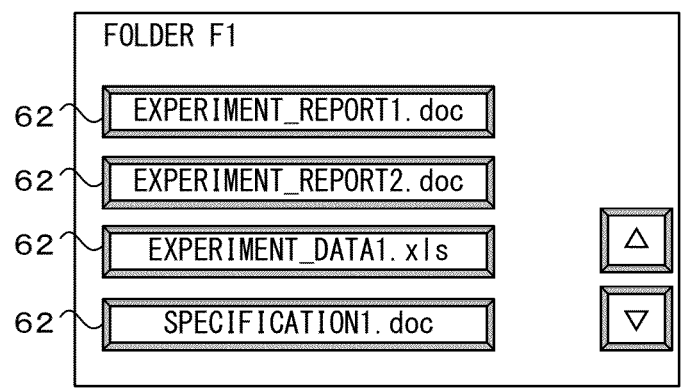

Here, FIG. 5B shows one example of the document sheet data selection screen displayed on the operation display portion 6. As shown in FIG. 5B, multiple document sheet data keys 62 showing filenames of document sheet data stored in the data storage portion 81 are displayed on the document sheet data selection screen.

Then, the control portion 5 reads document sheet data corresponding to a document sheet data key 62 selected by a user operation performed on the operation display portion 6 on the document sheet data selection screen, among the document sheet data stored in the data storage portion 81 of information processing apparatus 80. Here, the control portion 5 executing the step S2 corresponds to a data selection portion.

Here, the document sheet data P11 is stored in advance in folder F1 provided in the data storage portion 81 of a specific information processing apparatus 80 (hereinafter, referred to as "information processing apparatus 80A") among the multiple information processing apparatuses 80. In this case, at the step S1, in accordance with the user operation performed on the operation display portion 6, the address keys 61 corresponding to the folder F1 provided in the data storage portion 81 of the information processing apparatus 80A are configured as addresses. Then, at the step S2, in accordance with the user operation performed on the operation display portion 6, the document sheet data keys 62 corresponding to the document sheet data P11 stored in the folder F1 of the information processing apparatus 80A is selected. It should be noted that the control portion 5 may have a configuration in which it is possible to individually configure the storage source of the document sheet data 11 and the storage destination of the PDF data in accordance with the user operation.

[Step S3]

At step S3, the control portion 5 causes processes to standby until a scan start operation is performed by the user on the operation display portion 6 ("No" side at S3). Then, when it is determined that the start operation is performed, the control portion 5 moves the process to step S4.

[Step S4]

At the step S4, the control portion 5 reads image data from a document sheet set by the ADF 2 or a document sheet placed on document sheet table 1 by controlling the image reading portion 1. In the above described example, the image data P12 (cf. FIG. 4B) is read from a document sheet printed based on the document sheet data P11 and sealed with a seal.

It should be noted that, it is conceivable to have the control portion 5 determine whether or not there is tilting of the image data read from the image reading portion 1, and, when there is tilting of the image data, eliminate the tilting of the image data by executing a rotation process for the image data.

[Step S5]

Then, at step S5, the control portion 5 extracts text data from the document sheet data selected at the step S2, and generates transparent text data by making the text data to be transparent. Here, the control portion 5 executing the step S5 corresponds to a data extraction portion.

More specifically, the control portion 5 extracts text data contained in the document sheet data and various arrangement information of the text data, by using some of the conventionally known conversion functions that convert the document sheet data into PDF data. The conversion functions include, for example, a function of converting the document sheet data into PDF data through a page description language such as PostScript (Registered trademark), or a function of converting the document sheet data into PDF data through GDI (Graphics Device Interface) etc. Then, the control portion 5 generates the transparent text data by converting the character color of the text data into transparent color. In the transparent text data generated in such manner, the arrangement positions of text in a single page of the document sheet data are maintained. It should be noted that the technique for generating the transparent text data is not limited thereto, and various kinds of commonly known technologies may be used.

Furthermore, it is conceivable to have the control portion 5 execute the steps S4 and S5 through parallel processing. In addition, it is also conceivable to have the steps S4 and S5 executed independently by different control portions. Furthermore, it is also conceivable to have a generation process of the transparent text data at the step S5 executed when the document sheet data is selected at the step S2.

[Step S6]

Then, at step S6, the control portion 5 generates text-searchable PDF data by superimposing the image data read at the step S4 and the transparent text data generated at the step S5. Here, the control portion 5 executing a data generation step of generating the text-searchable PDF data at the step S6, corresponds to a data generation portion. The PDF data is stored in the EEPROM 54 of the control portion 5. It should be noted that the PDF data generated at the step S6 is merely one example of the text-searchable electronic data, and may be text-searchable electronic data in an information processing apparatus such as the information processing apparatus 80.

At this step, the control portion 5 combines the transparent text data and the image data such that positions of characters in the image data and positions of characters in the document sheet data match at the same positions. More specifically, since arrangement positions of text in the document sheet data are maintained in the transparent text data, positions of characters in both the transparent text data and the image data match when the page sizes thereof are the same. It should be noted that, when the document sheet data is shrunk or enlarged for printing, the page sizes of the document sheet data and the image data become different. Therefore, when the page sizes of the document sheet data and the image data are different, the control portion 5 enlarges or shrinks the transparent text data of the document sheet data so as to have the same page size as that of the document sheet data, and then combines the transparent text data and the image data. With this, correct positions are shown at the time of text search even when the sizes of the document sheet data and the image data are different.

Figure 4C:
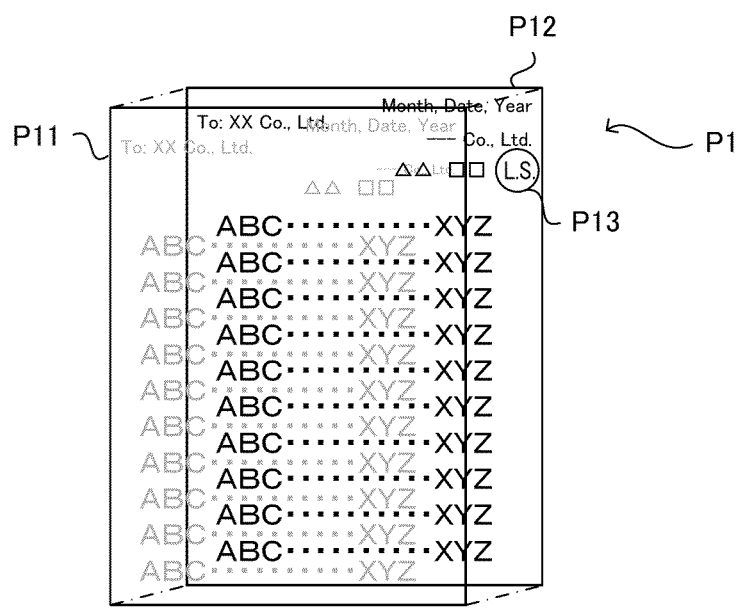

FIG. 4C shows one example of PDF data P1 obtained by combining the image data P12 and the transparent text data of the document sheet data P11. As shown in FIG. 4C, in the PDF data P1, the image data P12 and the transparent text data of the document sheet data P11 form a layer structure.

It should be noted that the generation technique for the text-searchable PDF data may be similar to a prior art of generating text-searchable PDF data by superimposing, onto the image data, transparent text data obtained by causing, to be transparent, text data recognized by a character-recognition function from the image data. Furthermore, it is also conceivable to have the control portion 5 generate the text-searchable PDF data by converting the document sheet data P11 into transparent text-containing PDF data at the step S5, and combining the PDF data and the image data at the step S6.

[Step S7]

The control portion 5 transmits the PDF data generated at the step S6 to the information processing apparatus 80 configured as the address at the step S1, and stores the PDF data in the data storage portion 81.

In the above described example, the PDF data P1 is stored in the folder F1 of the data storage portion 81 of the information processing apparatus 80A. With this, in the information processing apparatus 80A, it becomes possible to conduct a text-search with high accuracy in a search target which is the transparent text data embedded in the PDF data P1, when the PDF data P1 stored in the data storage portion 81 is displayed on a liquid crystal monitor which is not shown.

It should be noted that, in the present embodiment, although description is provided using as an example a case in which the text-searchable PDF data is externally transmitted by the network scanning function, the PDF data may be simply stored in a storage portion such as a hard disk provided within the multifunction peripheral 10.

As described above, in the multifunction peripheral 10, the text-searchable PDF data is generated by superimposing the image data read from the document sheet at the image reading portion 1 and the document sheet data stored in advance in the data storage portion 81. Therefore, PDF data with high text-search accuracy can be obtained when compared to a case of superimposing text data recognized through a character-recognition function based on image data read from a document sheet and the image data. In particular, since the transparent text data is generated from the document sheet data, it is not necessary to use a control apparatus having high processing capability for the purpose of improving accuracy of the character-recognition function. On the other hand, when text-searchable electronic data is to be generated using the character-recognition function, there is a problem where the accuracy when text-searching the electronic data depends on the character recognition accuracy of the character-recognition function.

It should be noted that, in the present embodiment, although the multifunction peripheral 10 is described as one example of the image processing apparatus according to the present disclosure, the present disclosure may be applied to an information processing apparatus such as the information processing apparatus 80. Thus, the image processing apparatus according to the present disclosure may have a configuration of not including an image reading portion such as the image reading portion 1.

More specifically, a control apparatus including a CPU, a RAM, a ROM, an EEPROM, and the like mounted on the information processing apparatus 80 generates text-searchable PDF data by executing a process similar to the steps S2, S5, and S6 in the PDF reading process. Thus, the control apparatus selects document sheet data stored in the data storage portion 81 (S2), and generates transparent text data by causing, to be transparent, text data contained in the document sheet data (S5). Then, the control apparatus receives, from the multifunction peripheral 10, image data read by the multifunction peripheral 10, and generates text-searchable PDF data by superimposing the image data and the transparent text data (S6). In addition, it is also conceivable to execute the process steps of the PDF reading process (cf. FIG. 3) by the multifunction peripheral 10 and the information processing apparatus 80 in a distributed manner. In this case, an image processing system including the multifunction peripheral 10 and image processing apparatus 80 corresponds to the image processing apparatus of the present disclosure.

Other Embodiments

It is also conceivable for the document sheet data selected at the step S2 to be document sheet data containing multiple pages. Therefore, another embodiment is conceivable in which, at the step S2, the control portion 5 selects a page in which image data is to be combined in the PDF reading process among the document sheet data, in accordance with a user operation performed on the operation display portion 6. Then, the control portion 5 generates text-searchable PDF data by superimposing a specific page selected in advance from pages contained in the document sheet data and the image data.

Figure 6:
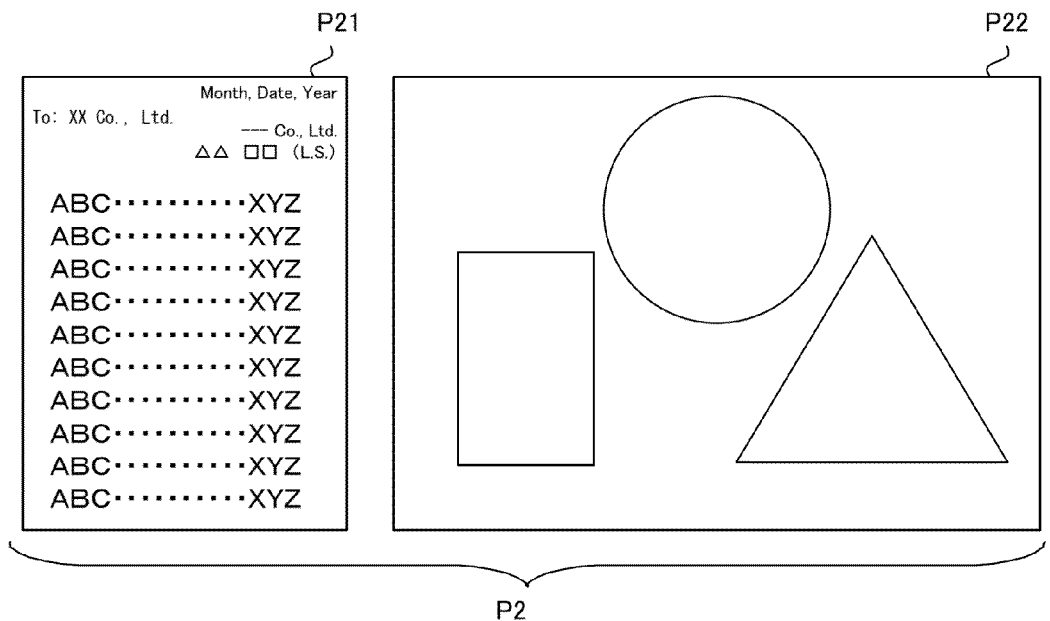
FIG. 6 shows one example of the document sheet data according to one embodiment of the present disclosure.

For example, as shown in FIG. 6, document sheet data P2 contains data for two pages, an A4-sized document sheet data P21 and an A3-sized document sheet data P22 such as a drawing. Here, a case will be discussed in which text-searchable PDF data is generated from image data read from a document sheet after the document sheet data P21 among the document sheet data P2 is printed.

In this case, the document sheet data P21 among the document sheet data P2 is selected by a user operation performed on the operation display portion 6, as a page in which image data is to be combined in the PDF reading process. The control portion 5 generates text-searchable PDF data P31 shown in FIG. 7 by superimposing image data read from the document sheet and transparent text data obtained by causing, to be transparent, text data contained in the document sheet data P21. On the other hand, the control portion 5 executes a conversion process of converting the document sheet data P22 without the document sheet data P21 among the document sheet data P2 into text-searchable PDF data P32 which is in the same format as the PDF data 31. Here, the control portion 5 executing the conversion process corresponds to a conversion portion.

Figure 7:
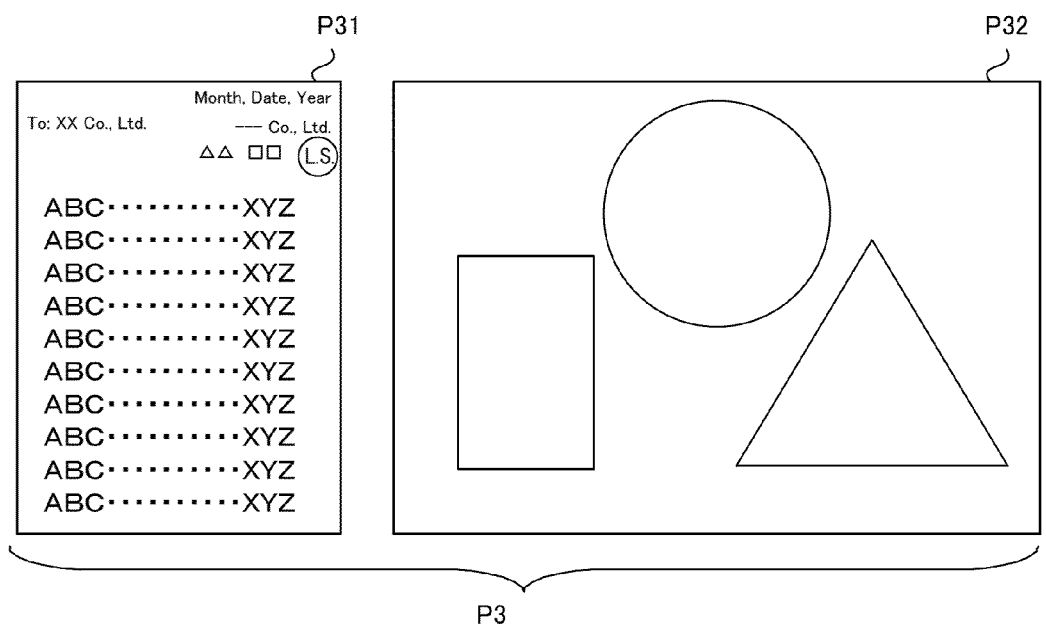
FIG. 7 shows one example of the PDF data according to one embodiment of the present disclosure.

Then, as shown in FIG. 7, the control portion 5 executes a combining process of generating single PDF data P3 by combining the two pages of data of the PDF data 31 and the PDF data 32. Here, the control portion 5 executing the combining process corresponds to a page combining portion. With this, the PDF data P3 is generated in which only specific pages among the document sheet data P2 containing multiple pages are substituted with the text-searchable PDF data that contains the image data read from the document sheet. Furthermore, the control portion 5 can optionally select from a case of generating the PDF data P31 containing a single page and a case of generating the PDF data P3 containing two pages, in accordance with a user operation performed on the operation display portion 6.

In addition, when the size of the document sheet data stored in the data storage portion 81 is large, another embodiment is also conceivable in which the control portion 5 generates transparent text data each having a size that is set in advance as the size that can be read by the image reading portion 1 from document sheet data.

Figure 8A:
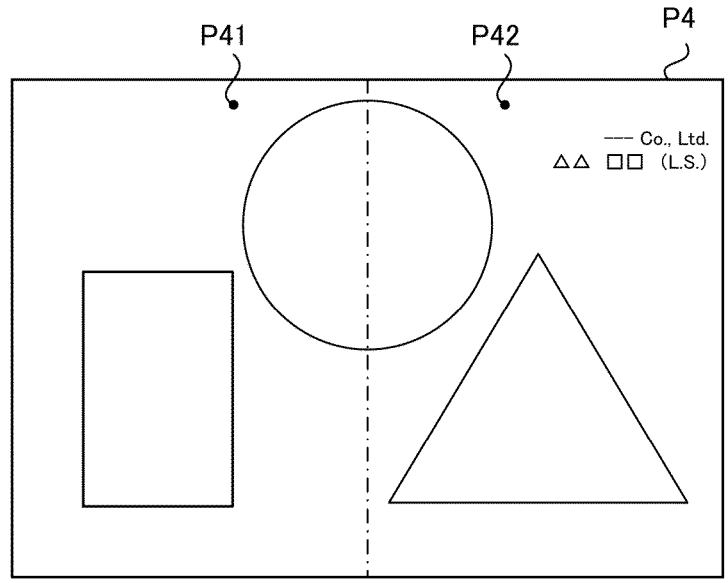
FIG. 8A and FIG. 8B show one example of the document sheet data and the PDF data according to one embodiment of the present disclosure.
Figure 8B:
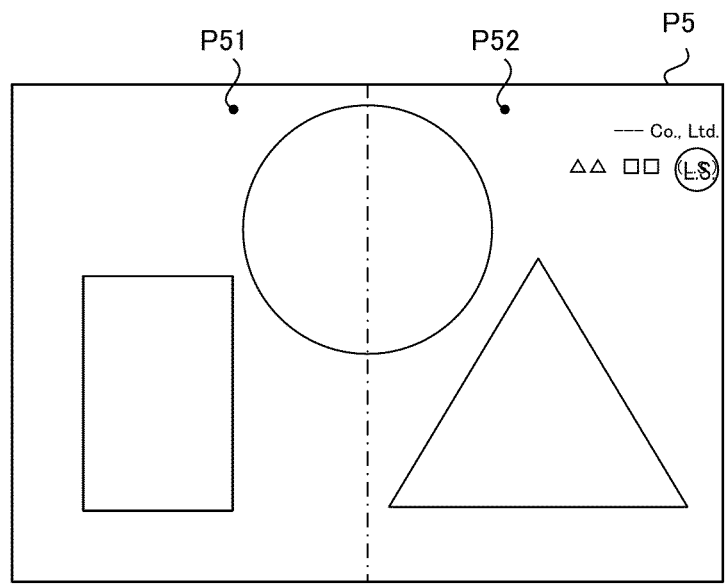

For example, document sheet data P4 shown in FIG. 8A and FIG. 8B is A3-sized document sheet data. Here, a case will be discussed in which text-searchable PDF data is generated from image data read from a document sheet after the document sheet data P4 is printed. The maximum readable size of the image reading portion 1 here is A4.

In this case, as shown in FIG. 8A and FIG. 8B, the control portion 5 divides the document sheet data P4 into A4-sized left-hand page P41 and right-hand page P42. Then, the control portion 5 individually generates the transparent text data each from the left-hand page P41 and the right-hand page P42. Then, when the image reading portion 1 reads two pieces of image data corresponding to the left-hand page P41 and the right-hand page P42 from the document sheet, the control portion 5 superimposes each pieces of the image data and the respective transparent text data. With this, A3-sized text-searchable PDF data P5 containing a left-hand page P51 and a right-hand page P52 respectively corresponding to the left-hand page P41 and the right-hand page P42 is generated. Furthermore, it is also conceivable to have the control portion 5 generate text-searchable PDF data through the above described procedure only for either the left-hand page P41 or the right-hand page P42, convert the document sheet data into PDF data for the other page, and then combine these PDF data.

It is to be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. An image processing apparatus comprising:
a data generation portion that generates text-searchable electronic data by superimposing transparent text data obtained by causing to be transparent text data contained in document sheet data stored in advance in a storage portion, and image data read from a document sheet by an image reading portion; and
a data selection portion that reads the document sheet data selected by a selection operation performed on an operation portion among the document sheet data stored in the storage portion communicably connected with the image processing apparatus via a communication network; wherein
the data generation portion superimposes transparent text data obtained by causing to be transparent text data contained in the document sheet data read by the data selection portion, and the image data.

2. An image processing method comprising the steps of:
preparing a storage portion having stored therein document sheet data containing text data;
generating text-searchable electronic data by superimposing transparent text data obtained by causing to be transparent the text data contained in the document sheet data stored in the storage portion, and image data read from a document sheet by an image reading portion;
reading with a data selection portion the document sheet data selected by a selection operation performed on an operation portion among the document sheet data stored in the storage portion communicably connected with an image processing apparatus via a communication network; and
superimposing transparent text data obtained by causing to be transparent text data contained in the document sheet data read by the data selection portion, and the image data.

3. A non-transitory computer-readable storage medium having stored therein an image processing program enabling execution of:
a data generation step of generating text-searchable electronic data by superimposing transparent text data obtained by causing to be transparent text data contained in document sheet data, and image data read from a document sheet by image reading means; and
a data selection step of reading the document sheet data selected by a selection operation performed on an operation portion among the document sheet data stored in a storage portion communicably connected with an image processing apparatus via a communication network; wherein
in the data generation step, transparent text data obtained by causing to be transparent text data contained in the document sheet data read in the data selection step, and the image data are superimposed.

4. An image processing apparatus comprising:
a storage portion;

a data generation portion that generates text-searchable electronic data by superimposing transparent text data obtained by causing to be transparent text data contained in document sheet data stored in advance in the storage portion, and image data read from a document sheet by an image reading portion; and a data selection portion that reads the document sheet data selected by a selection operation performed on an operation portion among the document sheet data stored in the storage portion; wherein the data generation portion superimposes transparent text data obtained by causing to be transparent text data contained in the document sheet data read by the data selection portion, and the image data.

5. An image processing method comprising the steps of:

preparing a storage portion having stored therein document sheet data containing text data;

generating text-searchable electronic data by superimposing transparent text data obtained by causing to be transparent the text data contained in the document sheet data stored in the storage portion, and image data read from a document sheet by an image reading portion;

reading with a data selection portion the document sheet data selected by a selection operation performed on an operation portion among the document sheet data stored in the storage portion; and superimposing transparent text data obtained by causing to be transparent text data contained in the document sheet data read by the data selection portion, and the image data.

6. A non-transitory computer-readable storage medium having stored therein an image processing program enabling execution of:

a data generation step of generating text-searchable electronic data by superimposing transparent text data obtained by causing to be transparent text data contained in document sheet data, and image data read from a document sheet by image reading means; and a data selection step of reading the document sheet data selected by a selection operation performed on an operation portion among the document sheet data stored in a storage portion; wherein in the data generation step, transparent text data obtained by causing, to be transparent, text data contained in the document sheet data read in the data selection step, and the image data are superimposed.

\* \* \* \* \*